(12) United States Patent
Mauritz et al.

(10) Patent No.: US 7,379,511 B2
(45) Date of Patent: May 27, 2008

(54) METHOD FOR REDUCING DC OFFSET ERROR FOR SINGLE ENDED AND DIFFERENTIAL SIGNALS

(75) Inventors: Karl H. Mauritz, Chandler, AZ (US); Linhbao T Nguyen, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 10/612,762

(22) Filed: Jun. 30, 2003

(65) Prior Publication Data

US 2004/0264582 A1 Dec. 30, 2004

(51) Int. Cl.
*H04L 25/06* (2006.01)

(52) U.S. Cl. .................. 375/319; 330/136; 330/279

(58) Field of Classification Search .............. 375/257, 375/258; 330/136, 279, 295, 296
See application file for complete search history.

(56) References Cited

U.S. PATENT DOCUMENTS

| | | | | |
|---|---|---|---|---|
| 4,462,098 A | * | 7/1984 | D'Avello et al. ........... 370/281 |
| 4,550,342 A | * | 10/1985 | Buchanan et al. .......... 348/531 |
| 4,641,324 A | * | 2/1987 | Karsh et al. ................ 375/317 |
| 4,926,442 A | * | 5/1990 | Bukowski et al. .......... 375/317 |
| 5,491,434 A | * | 2/1996 | Harnishfeger et al. ........ 327/50 |
| 6,211,716 B1 | * | 4/2001 | Nguyen et al. ............. 327/307 |
| 6,784,740 B1 | * | 8/2004 | Tabatabaei .................. 330/279 |
| 2003/0128558 A1 | * | 7/2003 | Takahashi et al. ............ 363/39 |
| 2004/0190650 A1 | * | 9/2004 | Khorram et al. ............ 375/334 |

* cited by examiner

*Primary Examiner*—Chieh M. Fan
*Assistant Examiner*—Jaison Joseph
(74) *Attorney, Agent, or Firm*—Schwegman, Lundberg & Woessner, P.A.

(57) ABSTRACT

A feedback signal generated as a function of a peak amplitude detected in an input signal provides bias to reduce DC offset. A peak in the input signal is compared with a selected signal level to align an output signal relative to a reference signal level. The output signal is generated by comparing the reference signal level and the biased input signal. Single ended signals are compared with a reference level and differential input signals are compared with each other to reduce jitter.

8 Claims, 4 Drawing Sheets

US 7,379,511 B2

METHOD FOR REDUCING DC OFFSET ERROR FOR SINGLE ENDED AND DIFFERENTIAL SIGNALS

FIELD OF THE INVENTION

The present subject matter relates to signaling in general and, more particularly, to correction of DC offset in high speed signaling.

BACKGROUND

The industry trend towards increased data rates in computers and other processor controlled equipment is limited by parasitic effects of high speed signaling. For example, the central processor unit front side bus, memory interface and input/output interface, are examples of high speed interconnects that are bandwidth limited as a result of jitter arising from excessive DC offset.

What is needed is a system for maintaining data integrity at high speed signaling rates.

DETAILED DESCRIPTION

Figure 1:
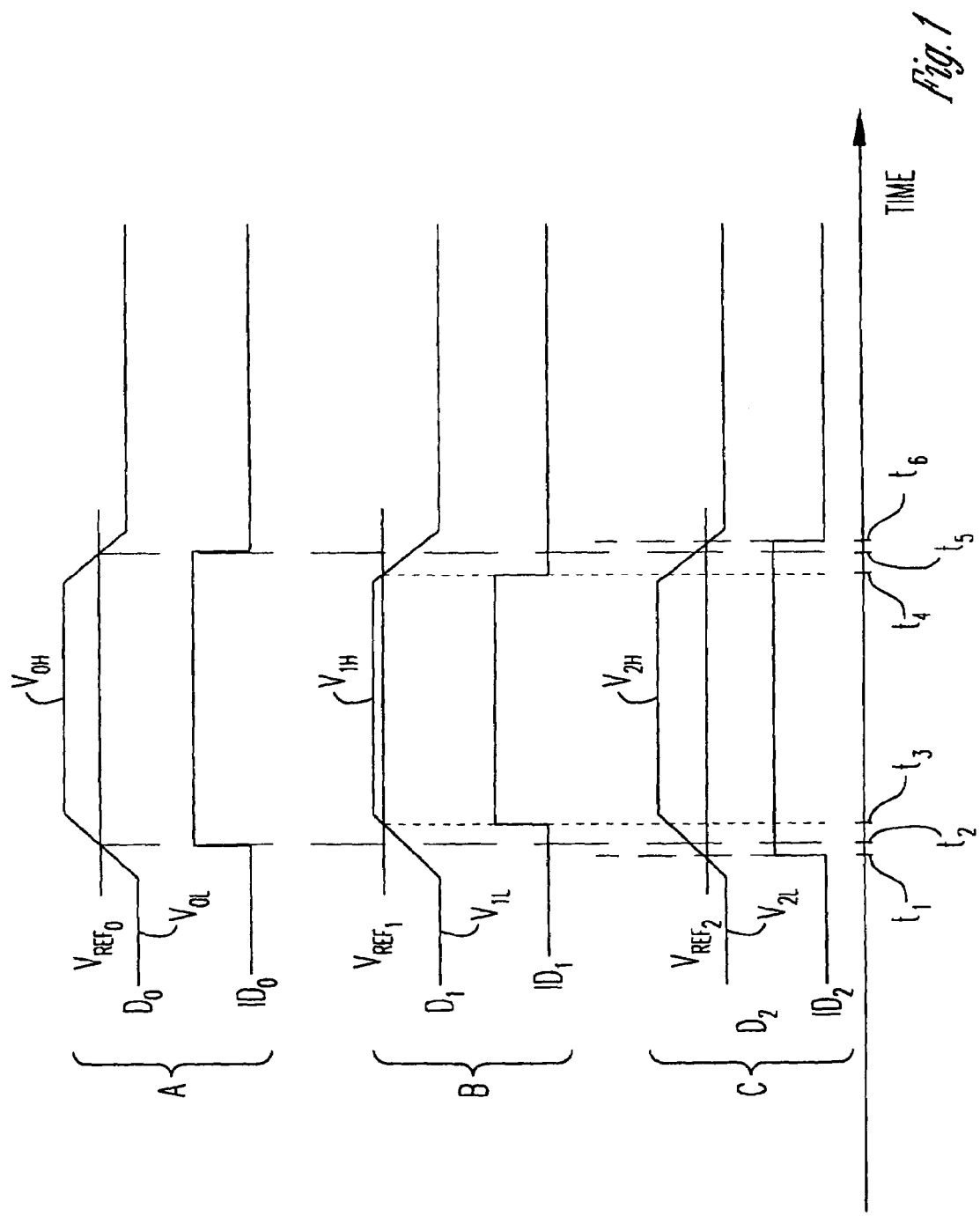
FIG. 1 illustrates timing diagrams for representative signal lines.

In the following detailed description, reference is made to the accompanying drawings which form a part hereof, and in which is shown by way of illustration specific embodiments in which the invention may be practiced. These embodiments are described in sufficient detail to enable those skilled in the art to practice the present subject matter, and it is to be understood that the embodiments may be combined, or that other embodiments may be utilized and that structural, logical and electrical changes may be made without departing from the spirit and scope of the present invention. The following detailed description is, therefore, not to be taken in a limiting sense, and the scope of the present subject matter is defined by the appended claims and their equivalents. In the drawings, like numerals describe substantially similar components throughout the several views. Like numerals having different letter suffixes represent different instances of substantially similar components.

FIG. 1 illustrates timing relationships between pairs of received signal levels and internal signals. For each pair of signals, $V_{ref}$ represents a threshold, or reference potential, with which signal D is compared. In the first pair, illustrated in set A, the amplitude of reference potential $V_{ref0}$ is centered on $V_{OL}$ and $V_{OH}$ of received signal $D_0$. Voltages $V_{OL}$ and $V_{OH}$ represent digital low and high voltage levels, respectively. For the example signals illustrated, the internal data signal $ID_0$ remains at a high level between time $t_2$ and time $t_5$.

In the second pair, illustrated as set B, signal $D_1$ has a negative offset or negative bias. Reference potential $V_{ref1}$ remains at the same level as $V_{ref0}$, however, signal $D_1$ is lower than signal $D_0$. The negative offset of $D_1$, relative to $V_{ref1}$ is manifested in a reduction of the high level duration of internal data signal $ID_1$. In particular, $ID_1$ remains at the high level between time $t_3$ and time $t_4$.

In the third pair, illustrated as set C, signal $D_2$ has a positive offset or positive bias. Reference potential $V_{ref2}$ remains at the same level as $V_{ref0}$, however, signal $D_2$ is higher than signal $D_0$. The positive offset of $D_2$, relative to $V_{ref2}$ is manifested in an increase of the high level duration of internal data signal $ID_2$. In particular, $ID_2$ remains at the high level between time $t_1$ and time $t_6$.

Depending upon the duty cycle of the signal, as well as other factors, the amplitude of the signal D will vary over time. As illustrated, this variation in amplitude of signal D appears as variations in the timing of the internal signal level ID. The variations in the timing of the internal signal level ID is known as jitter. In particular, the difference between time $t_1$ and $t_3$ is the rise time jitter and the difference between time $t_4$ and $t_6$ is the fall time jitter. Difficulties arise in discerning high and low logical levels, particularly at high speeds on large data busses, with increasing jitter.

Figure 2:
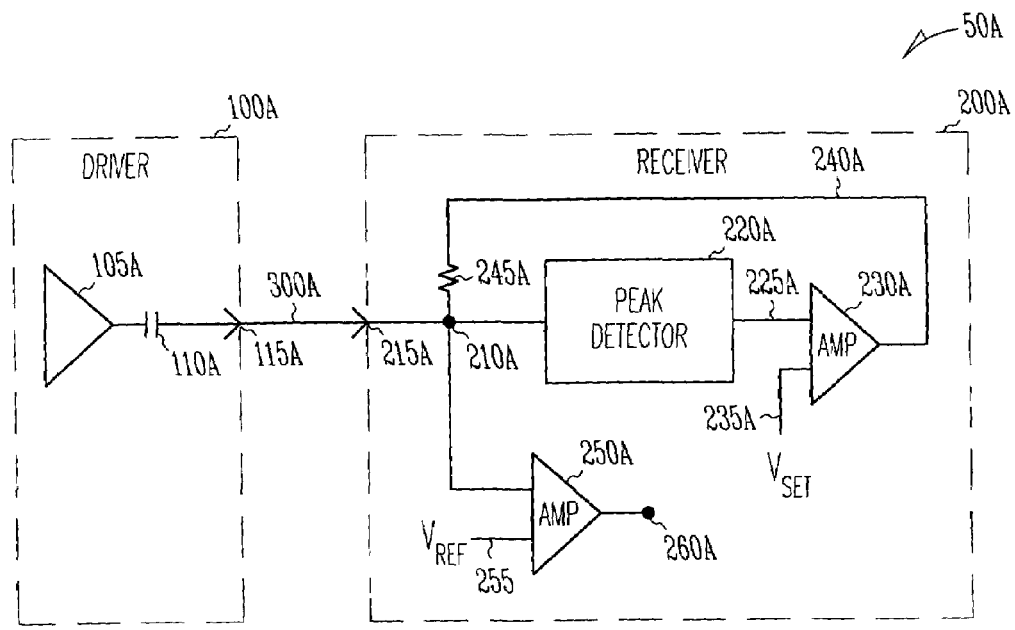
FIG. 2 includes a single ended circuit according to one embodiment of the present subject matter.

FIG. 2 illustrates single ended system 50A according to one embodiment of the present subject matter. In the figure, driver 100A and receiver 200A are coupled by link 300A. Link 300A, in various embodiments, includes a cable, a backplane, a signal trace or other conductor. In various embodiments, driver 100A and receiver 200A, are mounted on the same or separate structures, where each structure includes, for example, a chip, a board, a chassis or module.

Driver 100A includes output driver 105A and provides a logical signal to receiver 200A. In one embodiment, driver 100A and receiver 200A are powered by separate power supplies and thus, may not share a common ground potential. Driver 100A, in one embodiment, includes capacitor 110A. In one embodiment, capacitor 110A isolates a DC voltage between driver 100A and receiver 200A. In various embodiments, driver 100A includes a computer, such as a reduced instruction set computer or a complex instruction set computer. In various embodiments, driver 100A includes an interface, such as a network interface.

In one embodiment, driver 100A is coupled to link 300A by connector 115A and receiver 200A is coupled to link 300A by connector 215A.

Input terminal 210A of receiver 200A, is coupled to an input of peak detector 220A. The output of peak detector 220A is coupled to first input 225A of amplifier 230A. Second input 235A of amplifier 230A is coupled to a first reference potential, denoted in the figure as voltage $V_{set}$. Output 240A of amplifier 230A is coupled to input terminal 210A by series connected termination resistor 245A. The feedback from amplifier 230A provides a bias signal to counteract a DC offset that may be present on the input signal.

Receiver 200A also includes output amplifier 250A having a first input coupled to input terminal 210A and second input 255 coupled to a second reference potential, denoted in the figure as voltage $V_{ref}$. Output terminal 260A is coupled to the output of amplifier 250A.

In one embodiment, peak detector 220A includes a circuit to detect a minimum low value received at input 210A. Accordingly, reference potential $V_{set}$ is selected to set the low level on input 210A, denoted in FIG. 1 as $V_{OL}$. In one embodiment, this level is set to maximize, or improve, the sensitivity of amplifier 250A. In one embodiment, $V_{ref}$ is chosen to be related to the maximum input sensitivity of amplifier 250A. If a signal level from peak detector 220A, and delivered to amplifier 230A via first input 225, is lower than $V_{set}$, then output 240A will pull the voltage on input terminal 210A in an upward direction. If a signal level from peak detector 220A is greater than $V_{set}$, then output 240A will pull the voltage on input terminal 210A in a downward direction. A voltage on input terminal 210A is compared with reference potential $V_{ref}$ on input 255 and an output signal is generated at terminal 260A. An example of the output signal is illustrated as ID in FIG. 1 and is related to $V_{ref}$ and the signal on input 210A. As the length of the transmission lines between driver 100A and receiver 200A increases, the signal losses increase.

The feedback signal, provided to input terminal 210A via output 240A and resistor 245A, is effective to center the output signal, at terminal 260A, on the voltage level of reference potential $V_{ref}$. In one embodiment, the reference potential $V_{ref}$ is selected to fall in the center of the desired logical voltage levels.

In one embodiment, peak detector 220A includes a circuit to detect a maximum high value received at input 210A. Accordingly, reference potential $V_{set}$ is selected to match the highest level expected on input 210A, denoted in FIG. 1 as $V_{OH}$.

Peak detector 220A, in various embodiments, includes a diode, a capacitor or an operational amplifier. Other types of peak detectors are also contemplated. The peak detector generates an output signal corresponding to a peak amplitude sensed on an input signal received at input 210A. The peak amplitude may be a maximum high level $V_{OH}$ peak or a minimum low level $V_{OL}$ peak, as illustrated in FIG. 1.

Termination resistor 245A, in various embodiments, includes a discrete resistive element, a transistor or other active or passive component. Resistor 245A is selected to provide a desired input impedance.

Each of amplifier 230A and amplifier 250A, in various embodiments, includes a differential amplifier.

Figure 3:
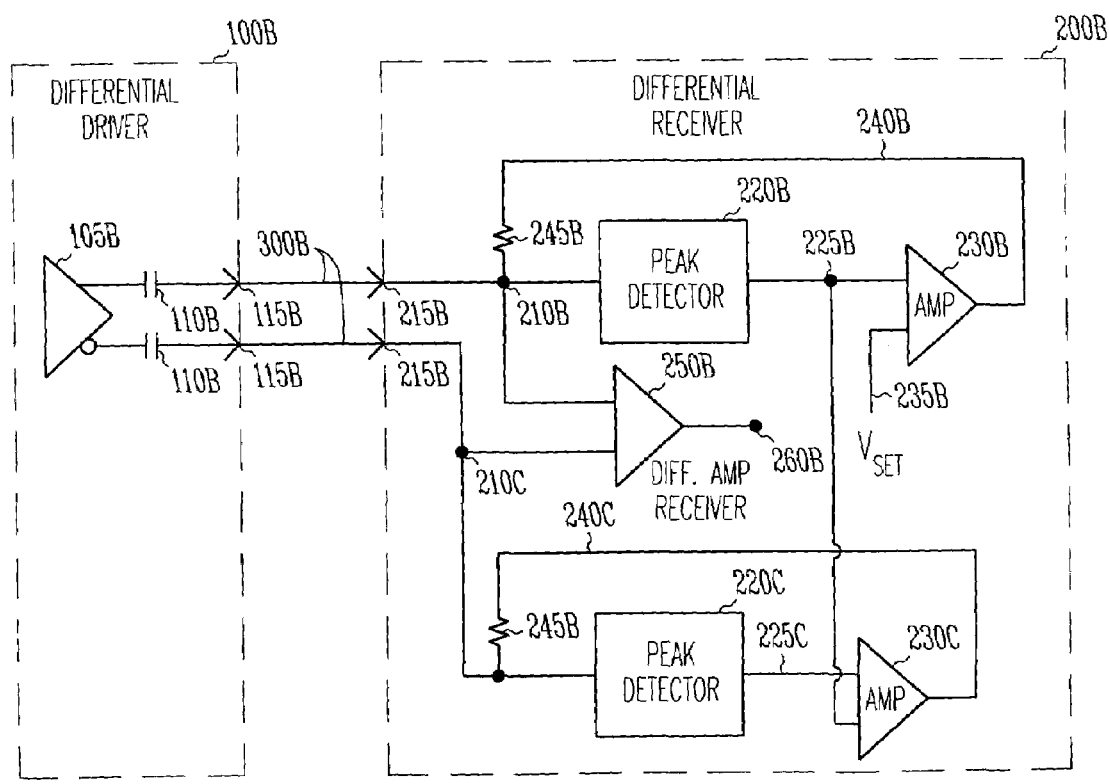
FIG. 3 includes a differential circuit according to one embodiment of the present subject matter.

FIG. 3 illustrates a differential signal system 50B according to one embodiment of the present subject matter. In the figure, driver 100B and receiver 200B are coupled by link 300B. Link 300B, in various embodiments, includes a cable, a backplane, a signal trace or other dual conductor. In various embodiments, driver 100B and receiver 200B, are mounted on the same or separate structures, where each structure includes, for example, a chip, a board, a chassis or module.

Driver 100B includes output driver 105B and provides a primary logical signal and a secondary logical signal to receiver 200B. The primary signal and the secondary signal are in complementary relation. In one embodiment, driver 100B and receiver 200B are powered by separate power supplies and thus, may not share a common ground potential. Driver 100B, in one embodiment, includes capacitors 110B. In one embodiment, capacitors 110B provide isolation of a DC voltage between driver 100B and receiver 200B.

In one embodiment, driver 100B is coupled to link 300B by connectors 115B and receiver 200B is coupled to link 300B by connectors 215B.

Primary input terminal 210B of receiver 200B, is coupled to an input of peak detector 220B. Secondary input terminal 210C of receiver 200B, is coupled to an input of peak detector 220C. The output of peak detector 220B is coupled to first input 225B of amplifier 230B. The output of peak detector 220C is coupled to first input 225C of amplifier 230C. Second input 235B of amplifier 230B is coupled to a first reference potential, denoted in the figure as voltage $V_{set}$.

The second input of amplifier 230C is coupled to first input 225B. Output 240B of amplifier 230B is coupled to input terminal 210B by series connected termination resistor 245B. Output 240C of amplifier 230C is coupled to input terminal 210C by series connected termination resistor 245B.

Receiver 200B also includes output amplifier 250B having a first input coupled to input terminal 210B and second input coupled to input terminal 210C. Output terminal 260B is coupled to the output of amplifier 250B. In one embodiment, output amplifier 250B includes a differential amplifier.

In various embodiments, peak detector 220B and peak detector 220C each include a circuit to detect a minimum low value received at the corresponding input terminal. Accordingly, reference potential $V_{set}$ is selected to match the lowest level desired. Reference potential $V_{set}$, in one embodiment, is selected to maximize, or increase, the sensitivity of amplifier 250B and peak detectors 220B and 220C and the control range of amplifiers 230B and 230C. In various embodiments, peak detector 220B and peak detector 220C each include a circuit to detect a maximum high value received at the corresponding input terminal. Accordingly, reference potential $V_{set}$ is selected to match the highest level expected.

Peak detector 220B and peak detector 220C, in various embodiments, each include a diode, a capacitor or an operational amplifier. Other types of peak detectors are also contemplated.

Termination resistor 245B, in various embodiments, includes a discrete resistive element, a transistor or other active or passive component. Resistor 245B is selected to provide a desired input impedance.

Each of amplifier 230B, amplifier 230C and amplifier 250B, in various embodiments, includes a differential amplifier.

Figure 6:
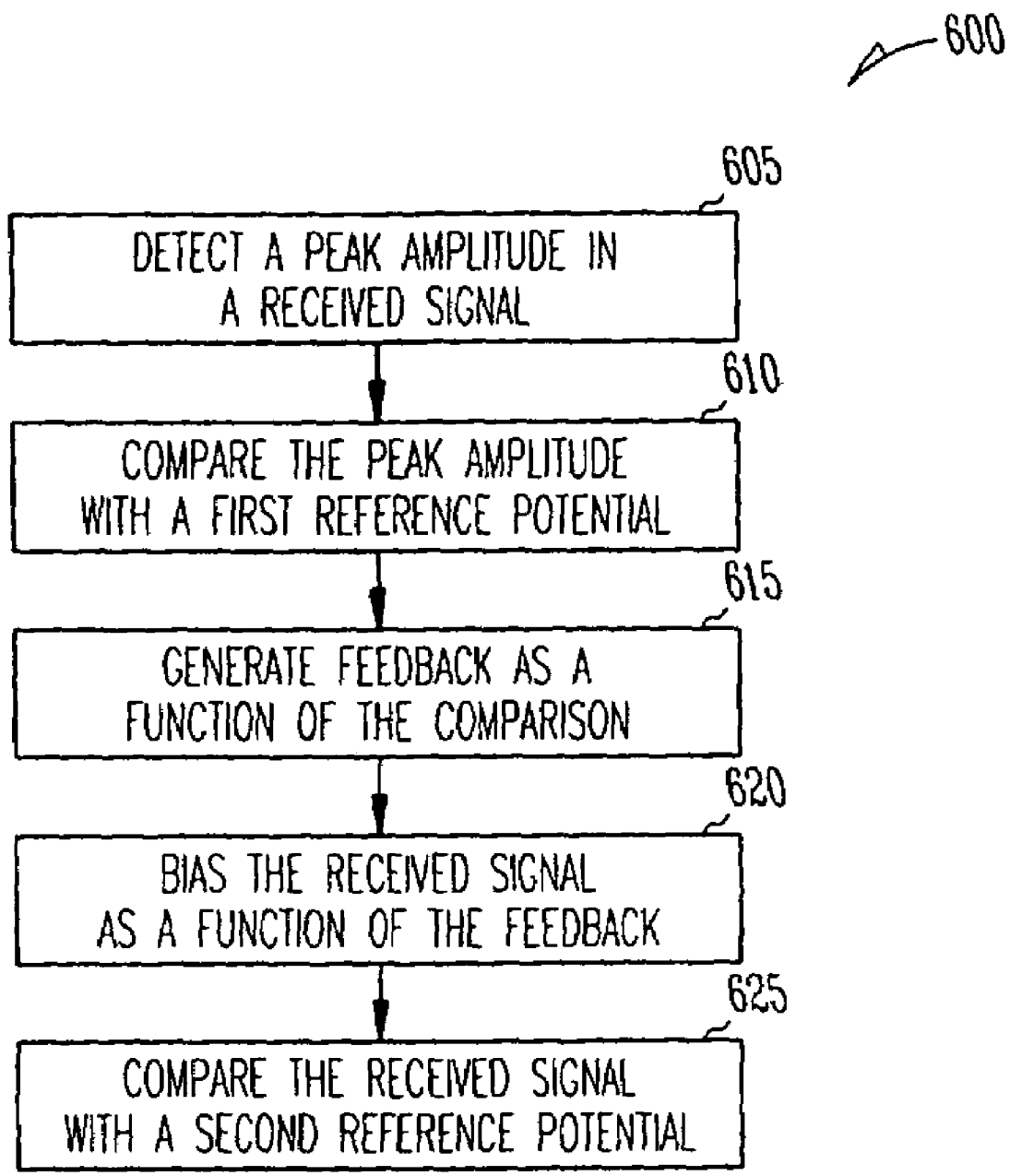
FIG. 6 illustrates a method according to one embodiment of the present subject matter.

FIG. 6 illustrates a method of correcting a DC offset of a received signal. According to the method illustrated, a signal is received and a peak amplitude is detected at 605. The peak amplitude may be a maximum high level or a minimum low level. In one embodiment, a peak detector is used to determine the peak amplitude. The output signal from the peak detector remains at the selected peak amplitude level for a predetermined period of time.

At 610, the peak amplitude is compared with a first reference potential. In various embodiments, the voltage level of the first reference potential is selected based on a function of the peak detector. In one embodiment, the voltage level of the first reference potential is based on a function of an input stage of the peak detector and the input stages of one or more differential amplifiers. For example, if the peak detector output corresponds to a minimum low level, then the first reference potential is selected as a low voltage level. If the peak detector output corresponds to a maximum high level, then the first reference potential is selected as a high voltage level. In one embodiment, the first reference potential is derived from an output of a complementary peak detector.

At 615, a feedback signal is generated as a function of the comparison. In one embodiment, a differential amplifier performs a comparison and generates a feedback signal.

At 620, the feedback signal is used to bias the received signal. For example, in one embodiment, a termination resistor couples the feedback signal and an input signal. In one embodiment, an operational amplifier is used to generate a biasing signal for the input signal.

At 625, the received signal is compared with a second reference potential. The second reference potential may be generated by a voltage divider network or other circuit based on the input signal. In one embodiment, the second reference potential is supplied by a driver circuit that also provides the received signal. In one embodiment, a complementary feedback circuit provides the second reference potential.

Alternative Embodiments

Figure 4:
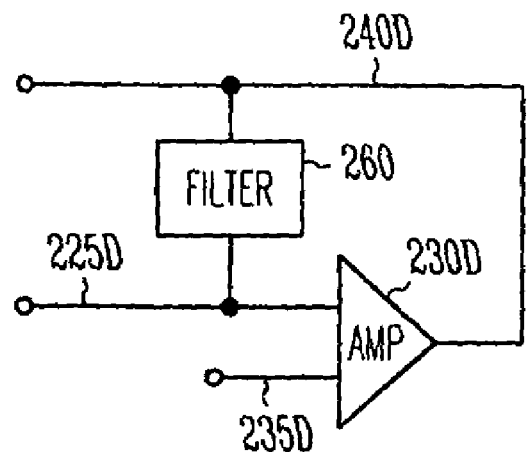
FIG. 4 illustrates a band limited amplifier according to one embodiment of the present subject matter.

Other embodiments are also contemplated. For example, in one embodiment, and as illustrated in FIG. 4, a feedback signal, on output 240A and delivered to the input terminal of the peak detector, is filtered to select a particular bandwidth. In the figure, filter 260 is coupled to input 225D and output 240D of amplifier 230D. Filter 260, in one embodiment, includes a capacitor, a resistor, an inductor or other passive or active components selected and configured to provide a desired feedback signal to input terminal 210A. For example, according to one embodiment, a suitably selected capacitor shunting input 225D and output 240D of amplifier 230D will establish a pass band of frequencies below which a feedback signal is generated and above which no feedback signal is provided.

Figure 5:
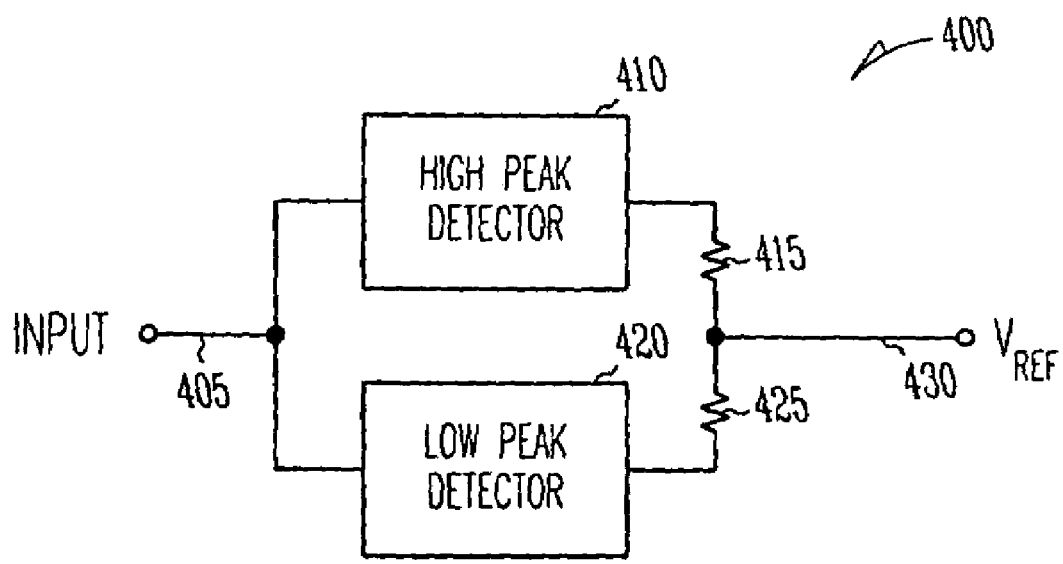
FIG. 5 illustrates a reference level generator circuit according to one embodiment of the present subject matter.

In one embodiment, as illustrated in circuit 400 of FIG. 5, reference potential $V_{ref}$ is generated at the receiver by a pair of peak detectors, 410 and 420. Peak detector 410 is configured to provide an output signal based on a high signal captured at input 405 and detector 420 is configured to provide an output signal based on a low signal captured at input 405. The output signals are coupled by a voltage divider, 415 and 425 and reference potential $V_{ref}$ is generated at center tap 430. Resistors 415 and 425, in various embodiments, include discrete resistors, operational amplifiers or transistors.

In one embodiment, an electro-optical interface includes a feedback circuit according to the present subject matter. For example, at the interface between a fiberoptic signal path and an electrical receiver or driver, the present subject matter can be applied to reduce the limiting effects of jitter caused by a DC offset.

In one embodiment, the input terminal of the receiver is coupled to a network interface. The network interface may include a large number of data lines terminating in a plurality of output terminals, each of which may be a single ended data line or pairs of which may be differential signals. In one embodiment, the network interface has a balanced duty cycle meaning that, on average, the number of data lines carrying a logical high level is equal to the number of data lines carrying a logical low level. In one embodiment, the network interface has an unbalanced duty cycle meaning that, on average, the number of data lines carrying a logical high level is unequal to the number of data lines carrying a logical low level. For example, an unbalanced interface may provide an 85% duty cycle, meaning that 85% of the data lines are carrying a particular logical level and the remaining 15% of the data lines are carrying a complementary logical level.

In one embodiment, the present subject matter is coupled to a reduced instruction set computer. A reduced instruction set computer recognizes fewer instructions than does a complex instructions set computer. In one embodiment, a reduced instruction set computer provides a signal, via a driver, to an embodiment of the present subject matter. Other types of computer systems are also contemplated for coupling to an embodiment of the present subject matter. The reduced instruction set computer may provide a signal having a balanced or unbalanced duty cycle. In various embodiments, the reduced instruction set computer provides a differential output signal or a single ended output signal.

The above description is intended to be illustrative, and not restrictive. Many other embodiments will be apparent to those of skill in the art upon reviewing the above description.

What is claimed is:

1. A system comprising:
    a driver having a primary output terminal and a secondary output terminal;
    a receiver having a primary input terminal coupled to the primary output terminal and a secondary input terminal coupled to the secondary output terminal;
    a primary peak detector coupled to the primary input terminal and having a primary peak output;
    an output amplifier having a first amplifier input coupled to the primary input terminal and a second amplifier input coupled to a first reference potential;
    a primary feedback amplifier having a first primary feedback input coupled to the primary peak output and a second primary feedback input coupled to a second reference potential and having a primary feedback output;
    a primary feedback circuit coupled to the primary feedback output and coupled to the primary input terminal; and
    a secondary peak detector coupled to the secondary input terminal and having a secondary peak output;
    a secondary feedback amplifier having a first secondary feedback input coupled to the secondary peak output and a second secondary feedback input coupled to the primary peak output and having a secondary feedback output; and
    a secondary feedback circuit coupled to the secondary feedback output and coupled to the secondary input terminal; and
    wherein the second amplifier input is coupled to the secondary input terminal.

2. The system of claim 1 further including a capacitor between the primary output terminal and the primary input terminal.

3. The system of claim 1 further including a primary filter coupled between the first primary feedback input and the primary feedback output.

4. The system of claim 3 wherein the primary filter includes a capacitor.

5. The system of claim 1 wherein the primary feedback circuit includes a resistor.

6. The system of claim 1 wherein the primary feedback circuit includes a transistor.

7. The system of claim 1 wherein the primary input terminal is coupled to the primary output terminal by a cable.

8. The system of claim 1 wherein the primary input terminal is coupled to the primary external output terminal by a backplane.

* * * * *